(12) United States Patent
Jensen

(10) Patent No.: US 9,579,757 B2
(45) Date of Patent: Feb. 28, 2017

(54) ALIGNING TOOL IN THE FIELD OF WIND TURBINES FOR ALIGNING A HOLE WITH A FASTENER

(71) Applicant: Martin Johan Smith Jensen, Børkop (DK)

(72) Inventor: Martin Johan Smith Jensen, Børkop (DK)

(73) Assignee: SIEMENS AKTIENGESELLSCHAFT, München (DE)

( * ) Notice: Subject to any disclaimer, the term of this patent is extended or adjusted under 35 U.S.C. 154(b) by 494 days.

(21) Appl. No.: 13/896,536

(22) Filed: May 17, 2013

(65) Prior Publication Data

US 2013/0312241 A1 Nov. 28, 2013

(30) Foreign Application Priority Data

May 22, 2012 (EP) .................... 12168844

(51) Int. Cl.
*B23P 19/12* (2006.01)
*F03D 1/00* (2006.01)
*F16B 37/14* (2006.01)
*F16B 19/02* (2006.01)

(52) U.S. Cl.
CPC ............ *B23P 19/12* (2013.01); *F03D 1/001* (2013.01); *F03D 13/22* (2016.05); *F05B 2230/604* (2013.01); *F16B 19/02* (2013.01); *F16B 37/14* (2013.01); *Y02E 10/728* (2013.01); *Y02P 70/523* (2015.11); *Y10T 29/49895* (2015.01); *Y10T 29/53913* (2015.01)

(58) Field of Classification Search
CPC ... B23G 1/00; B23G 1/48; B23G 3/00; B23G 9/00
See application file for complete search history.

(56) References Cited

U.S. PATENT DOCUMENTS

| | | | | |
|---|---|---|---|---|
| 4,005,629 | A * | 2/1977 | Franklin | 403/49 |
| 4,883,399 | A * | 11/1989 | MacLean | 411/431 |
| 5,350,204 | A * | 9/1994 | Henniger | 285/323 |
| 5,442,133 | A * | 8/1995 | Arnold et al. | 174/51 |
| 6,135,509 | A * | 10/2000 | Billington, III | 285/92 |
| 7,788,802 | B2 * | 9/2010 | Schaty | 29/876 |
| 7,892,049 | B1 * | 2/2011 | Andler | H01R 4/34 439/801 |
| 2006/0162507 | A1 * | 7/2006 | Ito | 81/125 |
| 2006/0171794 | A1 * | 8/2006 | Ordonio et al. | 411/369 |
| 2010/0077696 | A1 | 4/2010 | Campbell, Jr. | |
| 2010/0080667 | A1 * | 4/2010 | Reed | 411/373 |
| 2010/0154602 | A1 * | 6/2010 | Piper | B25B 13/065 81/121.1 |
| 2012/0118631 | A1 * | 5/2012 | Richter | 174/77 R |

(Continued)

FOREIGN PATENT DOCUMENTS

| | | |
|---|---|---|
| CN | 101813069 A | 8/2010 |
| CN | 102374138 A | 3/2012 |

(Continued)

*Primary Examiner* — Lee D Wilson

(57) ABSTRACT

An aligning tool in the field of wind turbines is provided. The aligning tool has a first and second section. The second section has an outside diameter tapering down in a direction away from the first section. The aligning tool is connected to a fastener and can easily catch a corresponding hole.

7 Claims, 4 Drawing Sheets

(56) References Cited

U.S. PATENT DOCUMENTS

2013/0001954 A1* 1/2013 Garc A Maestre ..... F03D 1/001
                                                                          290/55
2013/0220086 A1* 8/2013 Peters ..................... B23B 31/10
                                                                          81/451

FOREIGN PATENT DOCUMENTS

| | | | |
|---|---|---|---|
| FR | 1338898 | A | 10/1963 |
| JP | 5332334 | A | 12/1993 |
| WO | WO 2011109658 | A2 | 9/2011 |
| WO | WO 2012034564 | A1 | 3/2012 |

* cited by examiner

ALIGNING TOOL IN THE FIELD OF WIND TURBINES FOR ALIGNING A HOLE WITH A FASTENER

CROSS REFERENCE TO RELATED APPLICATIONS

The present application claims priority to European Patent Office application No. 12168844.4 EP filed May 22, 2012, the entire content of which is hereby incorporated herein by reference.

FIELD OF INVENTION

The present invention relates to an aligning tool in the field of wind turbines for aligning a hole with a fastener for insertion of the fastener into the hole.

BACKGROUND OF INVENTION

Generally, a wind turbine comprises a tower which is installed on a foundation. The foundation comprises a large number of bolts protruding upwards. These bolts have to fit through the same number of through-holes in one or more flanges of the tower. Due to the large number of bolts that need to be aligned with their corresponding through-holes, the installation of the tower on the foundation can be difficult and time-consuming. In the past, the installation required many small turns of the tower with respect to the foundation in order to align the bolts and the through-holes.

SUMMARY OF INVENTION

It is one objective of the present invention to provide an approach for easy alignment of a hole and a fastener in the field of wind turbines.

Accordingly, an aligning tool in the field of wind turbines for aligning a hole with a fastener for insertion of the fastener into the hole is provided. The aligning tool comprises a first section adapted for connecting to the fastener and a second section having an outside diameter tapering down in a direction away from the first section.

The second section thus has one end having a smaller outside diameter than the other end. Herein, "diameter" refers to the largest chord of a cross-section of the corresponding element (hole, fastener or aligning tool). The cross-section of the element may be circular, rectangular or square, for example. The smaller outside diameter is smaller than the inside diameter of the hole which the aligning tool aligns with the fastener. The end with the smaller outside diameter will thus easily catch the corresponding hole. For example, one or more of the bolts mentioned in the introductory section may each be fitted with an aligning tool in accordance with the invention in a first step. In a second step, the tower is installed, wherein one or more of the corresponding holes in the flange of the tower are caught by a corresponding aligning tool. When the tower is lowered in a third step, the increasing outside diameter of each aligning tool forces the corresponding holes to become more and more aligned with each corresponding bolt. As one or more of the holes become aligned with their corresponding bolts, the rest of the holes will then follow to fit the rest of the bolts.

According to an embodiment, the first section comprises a receptacle to receive the fastener. The receptacle may be formed as a plain sleeve. Preferably, the receptacle is configured so as to receive the fastener in a snug manner.

According to a further embodiment, the first section comprises an inner thread adapted to be screwed onto the fastener. Thus, the aligning tool can be connected to the fastener in an easy manner. Typically, the first section will be screwed only onto an end portion of the fastener. The inner thread may be formed on the inside of the receptacle to receive the fastener.

According to a further embodiment, the aligning tool comprises a geometry adapted to apply a torque for screwing the first section onto the fastener. This simplifies the mounting of the aligning tool on a corresponding fastener.

According to a further embodiment, the geometry is adapted to come into engagement with a wrench or screwdriver. In particular, the geometry may be adapted to fit with a socket wrench, a single-ended wrench, a flat-tip screwdriver or a Phillips screwdriver.

According to a further embodiment, the geometry is formed as a hexagon head. Thus, for example a socket wrench with a hexagon-shaped socket may be used for applying a torque to the hexagon head.

According to a further embodiment, the hexagon head forms an end of the second section pointing away from the first section. Thus, the hexagon head forms a tip of the aligning tool.

Further, a set in the field of wind turbines is provided. The set comprises a first part comprising at least one fastener, a second part comprising at least one hole and an aligning tool in accordance with the present invention, the aligning tool being adapted to align the at least one hole and the at least one fastener for insertion of the at least one fastener into the at least one hole.

The "field of wind turbines" presently also covers foundations of wind turbines as well as other objects attached to wind turbines.

According to an embodiment, the second section of the aligning tool has a first outside diameter corresponding to the inside diameter of the hole, and a second outside diameter smaller than the first outside diameter, the second section tapering down from the first to the second diameter. Typically, the second outside diameter of the second section is much smaller than the inside diameter of the hole. For example, the second outside diameter of the second section may be half or a third of the diameter of the hole, or smaller.

According to a further embodiment, the first part is a foundation of a wind turbine and the second part is a section of a tower of the wind turbine. Thus, the one or more aligning tools are used to connect the foundation to the tower.

According to a further embodiment, the first part is a first section of a tower of a wind turbine and the second part is a second section of the tower. Thus, in this embodiment, the one or more aligning tools are used to connect two sections of a tower to each other.

According to a further embodiment, the fastener is a bolt, a screw, a stud or a pin. Generally speaking, the fastener may or may not have an outer thread in that portion that the aligning tool is connected to for the alignment process. In the case where the fastener does not have an outside thread, the first section may comprise a sleeve which fits snugly onto the portion of the fastener not having an outer thread. According to another embodiment, the fastener has a first and second portion, the second portion having a smaller diameter than the first portion and, in one embodiment, an outer thread. The first section of the aligning tool is connected to the second portion.

According to a further embodiment, the foundation has at least one row of circularly arranged bolts and the first section of the tower has at least one row of circularly arranged holes, wherein at least one aligning tool is screwed onto a bolt. Typically, the first section will have an inside and an outside flange, each flange comprising a row of circularly arranged holes. In this case, the foundation is also provided with two rows of circularly arranged bolts fitting to the first and the second row of holes, respectively. Two or more aligning tools may typically be used.

Further, a use of an aligning tool according to the present invention is provided for aligning a hole and a fastener for insertion of the fastener into the hole in the field of wind turbines.

Also, a method for assembling a wind turbine is provided, wherein a hole and a fastener are aligned for insertion of the fastener into the hole using an aligning tool in accordance with the invention.

For example, a tower of a wind turbine may be connected to a foundation of the wind turbine using the method.

BRIEF DESCRIPTION OF THE DRAWINGS

Further objects, features and advantages of the present invention will become apparent from the subsequent description and depending claims, taken in conjunction with the accompanying drawings, in which:

DETAILED DESCRIPTION OF INVENTION

Figure 1:
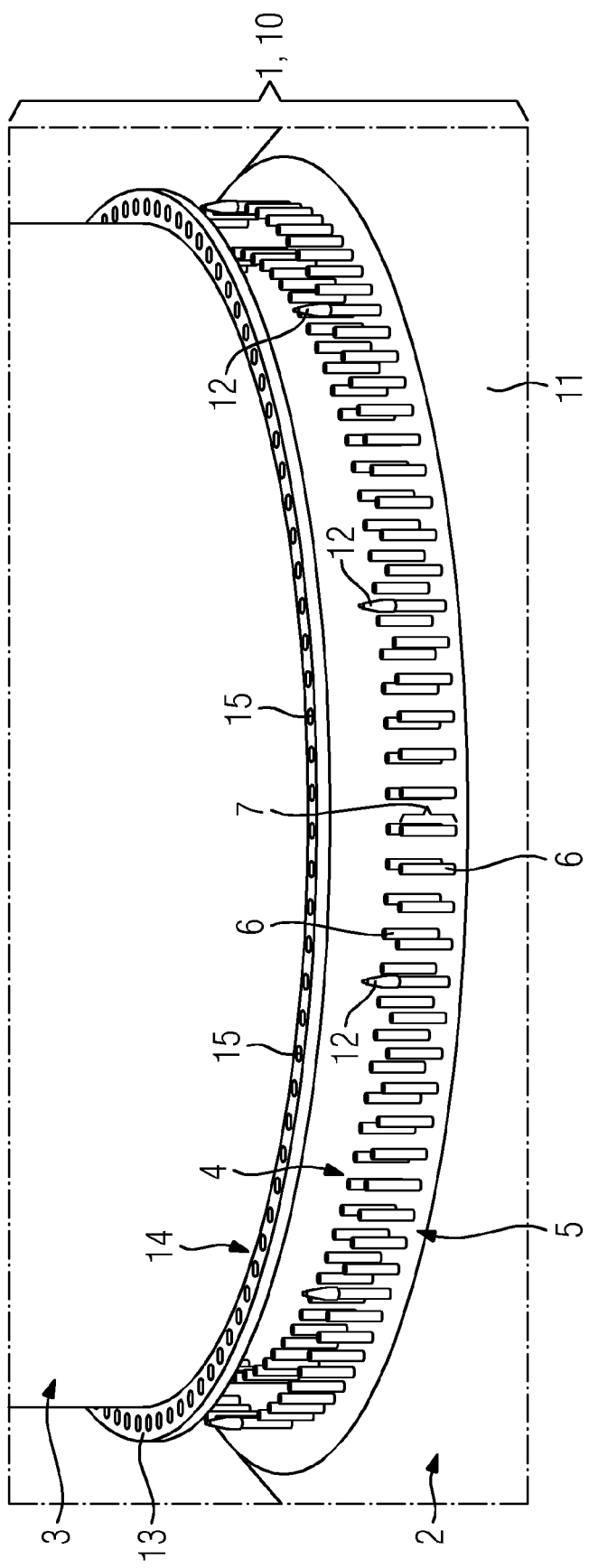
FIG. 1 is a perspective, partial view of a wind turbine tower being mounted to a foundation according to a first step in one embodiment.

In the Figures, like reference numerals designate like or functionally equivalents elements, unless otherwise indicated.

FIG. 1 shows in a perspective, partial view a wind turbine 1 being assembled. FIG. 1 shows a first step.

The wind turbine 1 comprises a first part in the form of a foundation 2 and a second part in the form of a tower 3.

The foundation 2 comprises an inner row 4 and an outer row 5 of fasteners in the form of bolts 6. In fact, FIG. 1 only shows a threaded shank 7 of each bolt 6 sticking out upwards from a concrete body 11 of the foundation 2.

A number of aligning tools 12 are provided. Each aligning tool 12 is attached to a respective bolt 6. For example, an aligning tool 12 may be attached to every tenth bolt of the outer row 5. The foundation 2, the tower 3 and the aligning tools 12 form together a set 10.

The tower 3 comprises an outer flange 13 at its lower end. Also, the tower 3 comprises an inner flange which is however not shown in FIG. 1.

The outer flange 13 has a row 14 of holes 15, each hole 15 corresponding to a bolt 6 in the outer row 5 of the foundation 2. The holes 15 are formed as through-holes. Likewise, the inner flange (not shown) comprises a row of holes, each hole corresponding to a bolt 6 in the inner row 4 of the foundation 2.

Figure 2:
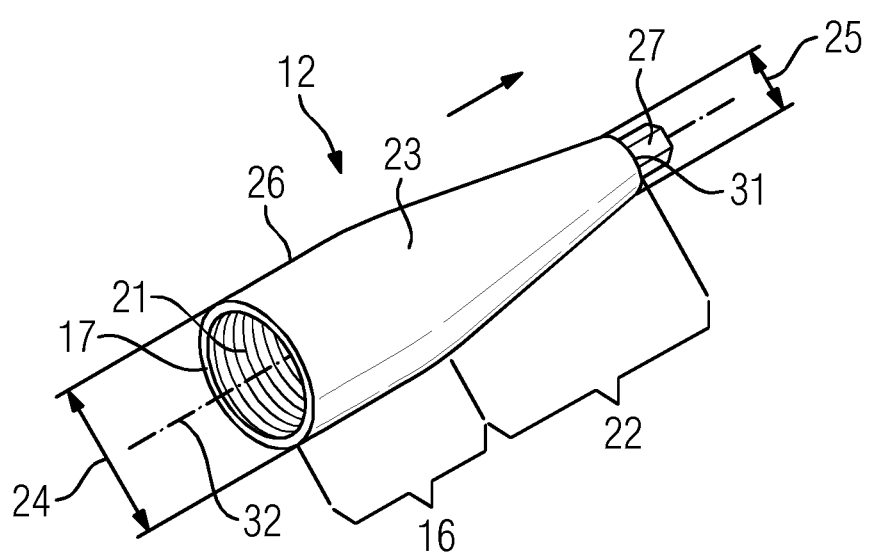
FIG. 2 illustrates in a perspective view an aligning tool from FIG. 1.

FIG. 2 is a perspective view of one of the aligning tools 12 from FIG. 1.

The aligning tool 12 comprises a first section 16 adapted for connecting to a threaded shank 7 of a bolt 6. To this end, the first section 16 has a sleeve-shaped receptacle 17, comprising an inner thread 21. The inner thread 21 corresponds to the outer thread of the shank 7 of a bolt 6.

Further, the aligning tool 12 comprises a second section 22 adjoining the first section 16. The second section 22 tapers down in a direction (indicated with an arrow in FIG. 2) away from the first section 16. The section 22 has a first end 23 having an outer diameter 24. The outer diameter 24 is the same as the outer diameter of the first section 16 and is configured to provide a clearance fit with a hole 15 in the flange 13 of the tower 3. The second section 22 tapers down from the outer diameter 24 to an outer diameter 25. The outer diameter 25 is much smaller than the outer diameter 24, and thus much smaller than the diameter of the hole 15. For example, the outer diameter 25 can be a third of the outer diameter 24.

Preferably, the first and second section 16, 22 are formed in one piece and have an smoothly contoured outer rocket-shaped surface 26.

Further, the aligning tool 12 comprises a geometry 27 adapted to apply a torque to the aligning tool 12 for screwing the inner thread 21 onto the shank 7 of a bolt 6. The geometry 27 is formed as a hexagon head, for example. The hexagon head 27 is adapted to come into engagement with a socket wrench, in particular. The hexagon head 27 may attach to a second end 31 of the second section 22 facing away from the first section 16. The hexagon head 27 has an outer diameter smaller or equal to the outer diameter 25. Also, the hexagon head 27 may be formed in one piece with the section 22.

The aligning tool 12 can be made of steel or plastic, in particular fiber-reinforced plastic.

Returning to FIG. 1, it can be seen that, first, the aligning tools 12 are screwed onto the shank 7 of a respective bolt 6 using a socket wrench (not shown), for example.

Figure 3:
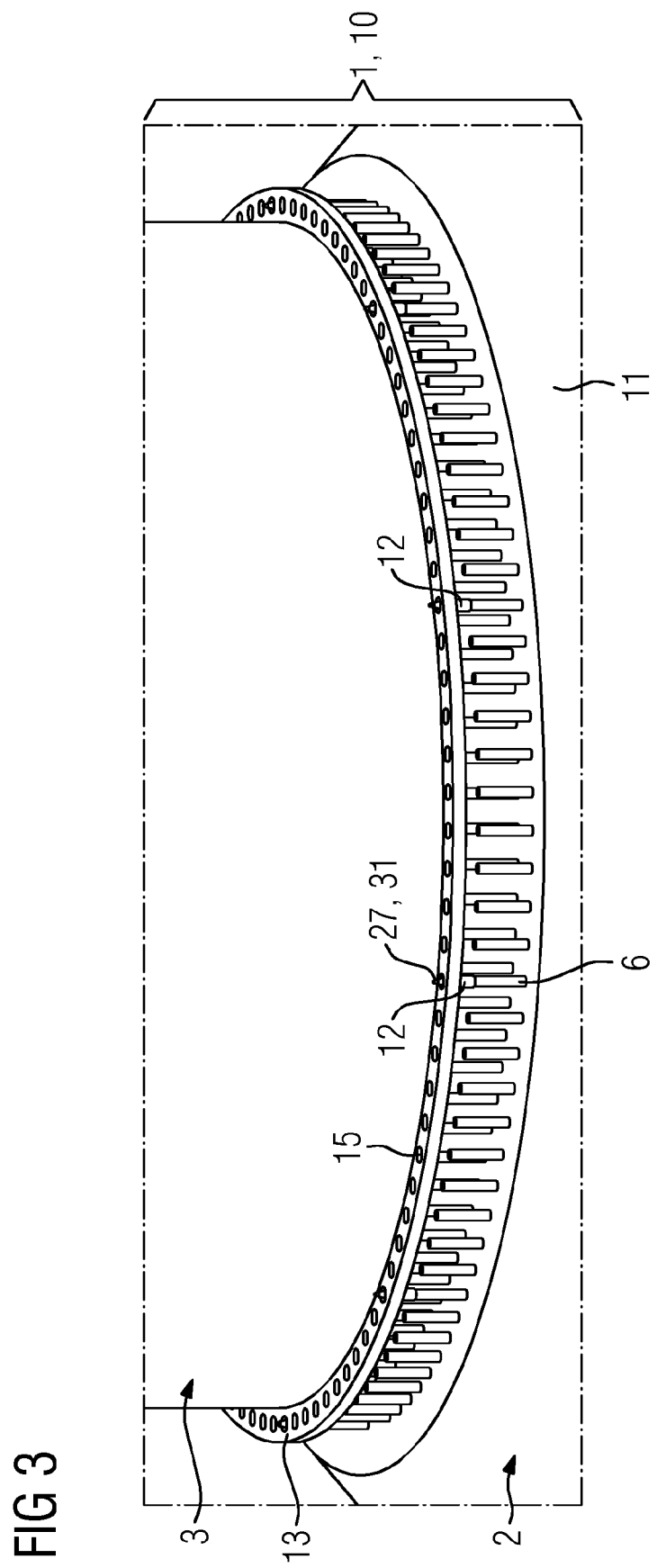
FIGS. 3 and 4 are perspective views of the tower and foundation from FIG. 1 according to a second and third step.

Thereafter, the tower 3 is lowered towards the foundation 2. Since the end 31 of each aligning tool 12 (as well as the hexagon head 27, if provided) has the small outer diameter 25, the end 31 (or the hexagon head 27) easily catches a corresponding hole 15 in the flange 13 of the tower 3, as shown in FIG. 3. Due to the increasing outer diameter of the second section 22, each hole 15 is centered with respect to a center line 32 of each aligning tool 12 as the tower 3 is lowered more and more towards the foundation 2. Of course, at the same time, each hole 15 is centered with respect to each bolt 6.

Figure 4:
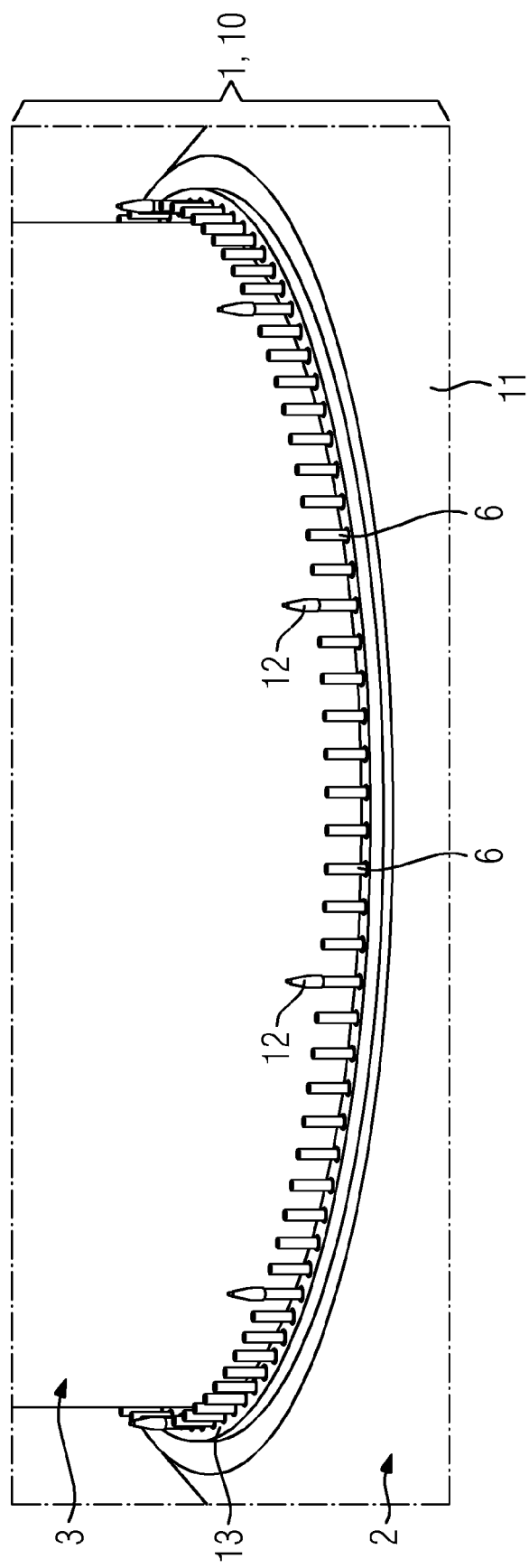

Thus, as shown in FIG. 4, all the holes 15 of the flange 13 (and also the holes of the inner flange, which are not shown) come into engagement with the shank 7 of a respective bolt 6. Once the tower 3 has been fully lowered, the flange 13 lies against the concrete body 11 as seen in FIG. 4. Then, the aligning tools 12 are unscrewed, for example using a socket wrench, from the bolts 6. The aligning tools 12 can be reused hereafter for a further aligning task at another tower installation. Hereafter, nuts (not shown) are screwed onto a shank 7 of each bolt 6 so as to fixedly connect the foundation 2 and the tower 3 to each other.

Although the present invention has been described in accordance with preferred embodiments, it is obvious for a person skilled in the art that modifications are possible in all embodiments.

For example, the aligning tools 12 may also or instead be attached to bolts 6 of the inner row 4 (see FIG. 1). Further, the aligning tools 12 may be used in connection with other fasteners, for example pins, which do not have an outer thread. In this case, the receptacle 17 of each aligning tool 12 may be formed without the inner thread 21.

The invention claimed is:

1. A set in a field of a wind turbine, comprising:
a first part comprising at least one fastener, wherein the first part is a foundation of the wind turbine, wherein the fastener is a bolt, wherein the foundation has at least one row of circularly arranged bolts, the bolts each comprising a threaded shank sticking out upwards from a concrete body of the foundation;
a second part comprising at least one hole, wherein the second part is a tower of the wind turbine, the tower having at least one row of circularly arranged holes; and
at least one aligning tool,
each aligning tool adapted to align the at least one hole and the at least one fastener for insertion of the at least one fastener into the at least one hole, each aligning tool comprising:
 a first section adapted for connecting to the at least one fastener, the first section comprising an inner thread adapted to be screwed onto a threaded shank; and
 a second section having an outside diameter continuously tapering down in a direction away from the first section, the second section having a first outside diameter corresponding to the inside diameter of the hole and a second outside diameter smaller than the first outside diameter, the second section tapering down from the first and the second diameter.

2. The aligning tool according to claim 1, wherein the first section comprises a receptacle to receive the fastener.

3. The aligning tool according to claim 1, wherein the geometry is adapted to apply a torque for screwing the first section onto the fastener.

4. The aligning tool according to claim 3, wherein the geometry is adapted to engage with a wrench or a screwdriver.

5. The aligning tool according to claim 4, wherein the geometry is formed as a hexagon head.

6. The aligning tool according to claim 5, wherein the hexagon head adjoins an end of the second section pointing away from the first section.

7. The aligning tool according to claim 1, wherein the first section and the second section comprise a smoothly contoured outer rocket-shaped surface.

* * * * *